United States Patent [19]
Goel

[11] Patent Number: 5,635,810
[45] Date of Patent: Jun. 3, 1997

[54] CONTROL SYSTEM FOR A PERMANENT MAGNET SYNCHRONOUS MOTOR

[75] Inventor: Rakesh Goel, Roorkee, India

[73] Assignee: Analog Devices, Inc., Norwood, Mass.

[21] Appl. No.: 531,126

[22] Filed: Sep. 20, 1995

[51] Int. Cl.[6] .................................................. H02P 5/40
[52] U.S. Cl. ........................... 318/719; 318/723; 318/729; 318/254
[58] Field of Search .................................. 318/138, 254, 318/245, 699–823

[56] References Cited

U.S. PATENT DOCUMENTS

| | | | |
|---|---|---|---|
| 4,162,435 | 7/1979 | Wright | 318/138 |
| 4,250,544 | 2/1981 | Alley | 318/138 |
| 4,443,747 | 4/1984 | Chausse et al. | 318/723 |
| 4,634,951 | 1/1987 | Kampf et al. | 318/778 |
| 4,636,936 | 1/1987 | Boyd, Jr. et al. | 318/254 |
| 4,642,536 | 2/1987 | Boyd, Jr. et al. | 318/254 |
| 4,654,566 | 3/1987 | Erdman | 318/254 |
| 4,710,692 | 12/1987 | Libert et al. | 318/729 |
| 4,724,503 | 2/1988 | Libert | 318/798 |
| 4,757,241 | 7/1988 | Young | 318/254 |
| 4,833,628 | 5/1989 | Curran, Jr. | 318/729 |
| 4,912,390 | 3/1990 | Curran, Jr. et al. | 318/812 |
| 5,144,564 | 9/1992 | Naidu et al. | 364/494 |
| 5,473,241 | 12/1995 | Chen et al. | 318/807 |
| 5,488,282 | 1/1996 | Unsworth et al. | 318/806 |

*Primary Examiner*—Paul Ip
*Attorney, Agent, or Firm*—Iandiorio & Teska

[57] ABSTRACT

A control system for a permanent magnet synchronous motor includes a position estimator means having for cross correlating the back EMF of the unenergized winding with a reference waveform to determine the estimated position of the rotor for determining rotor angle position error; an error compensator, responsive to the rotor angle position error, for determining the angular speed of the field; an angle generator, responsive to the angular speed of the field, for generating the field angle position; and a waveform generator, responsive to the rotor angle position, for generating a periodic signal corresponding to each winding and designating a segment of that signal for driving that winding to adjust the field speed to the rotor speed.

9 Claims, 5 Drawing Sheets

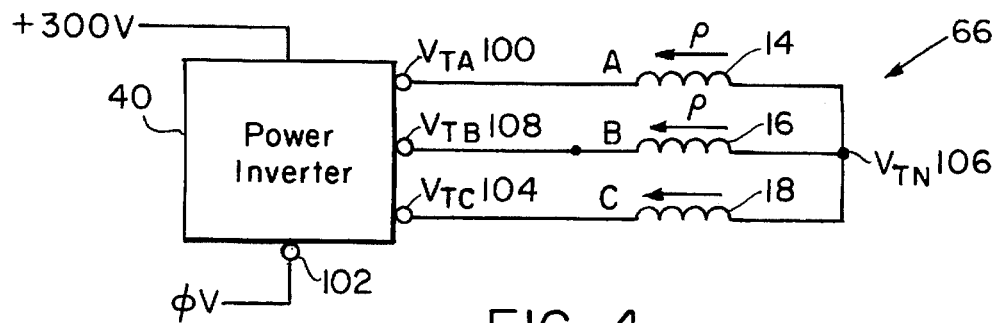
FIG. 4
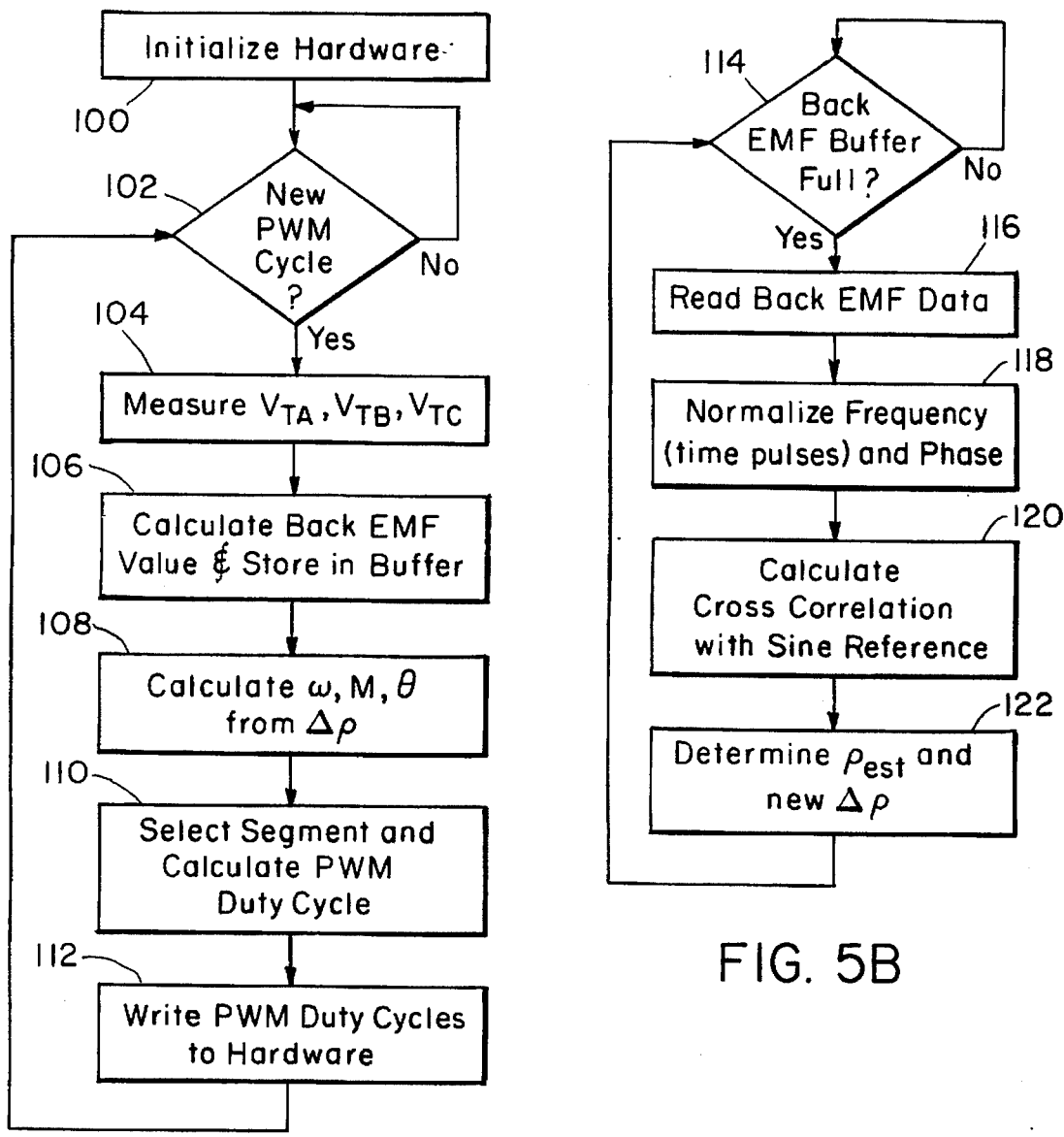
FIG. 5A
FIG. 5B 5,635,810

1

CONTROL SYSTEM FOR A PERMANENT MAGNET SYNCHRONOUS MOTOR

FIELD OF INVENTION

This invention relates to a control system for a permanent magnet synchronous motor, and more particularly to such a system which adjusts the field speed to accommodate for errors in rotor position without a direct position sensor.

BACKGROUND OF INVENTION

Electronically commutated permanent magnet synchronous motors employ a complex control circuit to switch the energization of the various field windings at the proper time to keep the field and rotor in synchronism. In one approach, as the rotor and field rotate there are always two field windings energized and one unenergized at each segment of rotation and the windings which are energized and unenergized change with each segment. The switching of the windings at the right time between the energized and unenergized states is done by integrating the back EMF of the unenergized winding until a threshold is reached at which point the switching is triggered. One shortcoming of this approach is that extremely high precision and expensive analog to digital conversion circuitry is required to insure that the back EMF derived switching is accurate. Another shortcoming is that the energizing voltage is generally constant, not sinusoidal, during a switching cycle so that the motors must be specially designed to be compatible with the control circuit.

SUMMARY OF INVENTION

It is therefore an object of this invention to provide an improved control system for a permanent magnet synchronous motor.

It is a further object of this invention to provide an improved control system which requires much less sophisticated and less expensive analog to digital conversion circuits.

It is a further object of this invention to provide an improved control system which delivers sinusoidal drive voltages compatible with common permanent magnetic synchronous motors.

It is a further object of this invention to provide an improved control system which adjusts the field speed to match the rotor position.

It is a further object of this invention to provide an improved control system which produces smoother torque characteristics without the need for specially designed motors.

The invention results from the realization that a truly effective, compatible control system for a permanent magnet synchronous motor can be achieved by cross-correlating segments of the back EMF waveform of the unenergized winding so that the optimum switching positions can be determined notwithstanding variation in scale of magnitude and matching between phases, and the further realization that by matching a segment made up of many parts, instead of just a single point as in a threshold approach, vulnerability to noise errors is greatly reduced.

DISCLOSURE OF PREFERRED EMBODIMENT

Other objects, features and advantages will occur to those skilled in the art from the following description of a preferred embodiment and the accompanying drawings, in which:

2

FIG. 4 is a schematic diagram of the center point estimator of FIG. 2; and

FIGS. 5A and 5B are flow charts of the motor control loop and position estimator loop routines that can be used to implement the invention in software.

Figure 1:
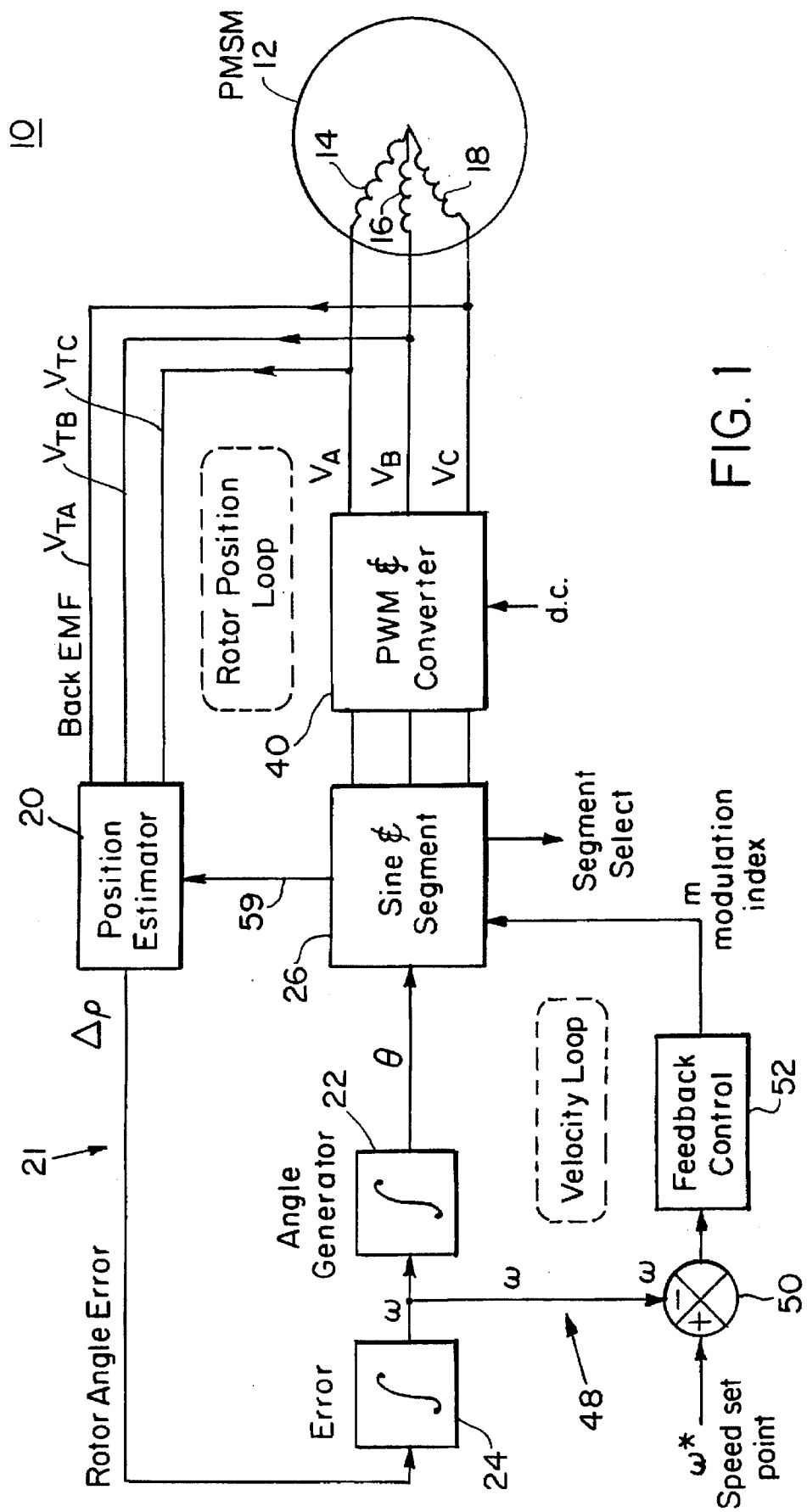
FIG. 1 is a block diagram of the control system for a permanent magnet synchronous motor according to this invention.

There is shown in FIG. 1 a control system 10 for a permanent magnet synchronous motor 12 which typically has three phased stator windings 14, 16, 18 whose terminal voltages, $V_{TA}$, $V_{TB}$ and $V_{TC}$ are sensed by position estimator 20. Position estimator 20 in rotor position loop 21 determines the rotor angle error $\Delta\rho$, which is the difference between the actual rotor position and the optimum rotor position with respect to the field. This error signal is delivered to compensator or error integrator circuit 22 which integrates the rotor angle error $\Delta\rho$ to obtain the field speed $\omega$. When the error $\Delta\rho$ input to error integrator 22 is zero, then the field speed $\omega$ is optimally synchronized with the rotor.

Angle generator 24 integrates the field speed $\omega$ to obtain the field position $\theta$ which is delivered to sine and segment circuit 26. Sine and segment circuit 26 produce a control signal 30, FIG. 1A, for each of the three windings 14, 16 and 18, 120° out of phase. Control voltage 30 defines the beginning 31 and end 33 of segment 32 and the beginning 35 and end 37 of segment 34 when the associated winding is supposed to be energized as well as those segments when it is supposed to be unenergized, such as indicated by slope 36 which is negative-going and slope 38 which is positive-going.

In addition to defining when the associated winding is to be energized and unenergized, segments 32 and 34 indicate the magnitude of the power to be supplied at each position $\theta$ of the rotor. These control voltages are employed by PWM and converter circuit 40 to convert the d.c. power supply input to pulse width modulated drive signal 41, FIG. 1B, whose pulses 43 are wider or narrower depending upon whether the voltage amplitude signal is higher or lower, respectively. Drive signal 41 represents the actual voltage applied to winding A 14. Similar drive voltages are developed by circuit 40 for winding 16 and 18. Sine and segment circuit 26 also provides a segment select signal on line 39 to position estimator 20 to indicate which is the presently unenergized winding.

Control system 10 also includes a velocity loop 48 which senses the field speed $\omega$ and compares it to the speed set point $\omega^*$ in summing circuit 50. Any difference between the two values causes feedback control 52 to increase or decrease the voltage level to sine and segment circuit 26 so that the magnitude of control signal 30 is increased or decreased accordingly. If the speed has fallen below the set point, the voltage is increased; if the speed has risen above the set point, the voltage will be decreased.

Figure 2:
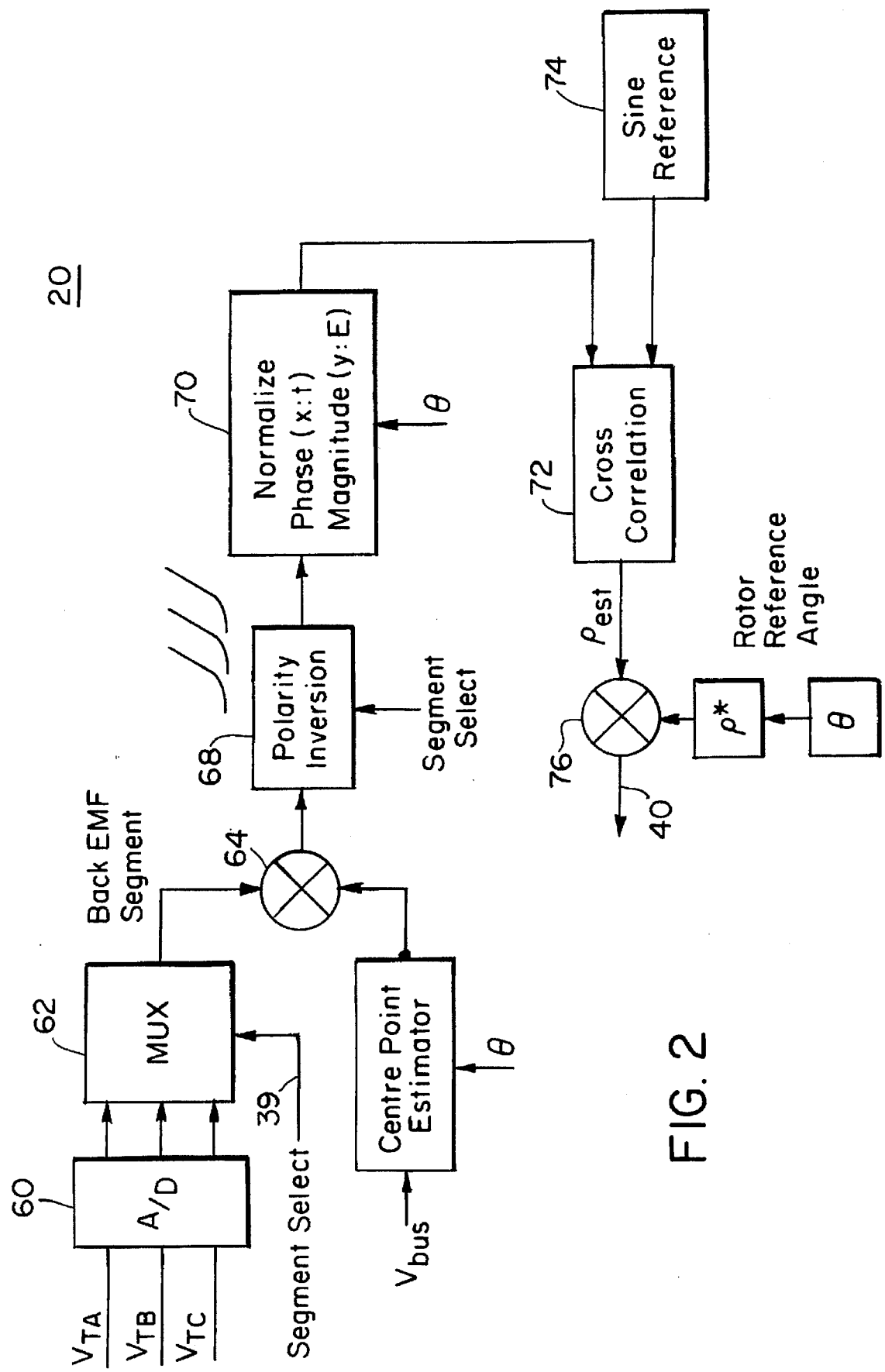
FIG. 2 is a more detailed block diagram of the position estimator of FIG. 1.

Position estimator 20, FIG. 2, receives the terminal voltages $V_{TA}$, $V_{TB}$, $V_{TC}$ at A/D converter 60 which is a relatively unsophisticated and inexpensive comparator based A/D converter. $V_{TA}$, $V_{TB}$ and $V_{TC}$ are submitted to multiplexer 62 which responds to the segment select signal from sine and segment circuit 26, FIG. 1, to supply the terminal voltage from the unenergized winding to summing circuit 64, FIG. 2. Center point estimator 66 responds to the field position θ obtained from angle generator circuit 24 to provide the center point of the voltage across the two energized windings. Center point estimator 66 also responds to the measurement voltage level on the d.c. supply bus, $V_{BUS}$, to accommodate for variations in that voltage which can distort the center point estimation calculations.

The difference output by summing circuit 64 is the voltage across the unenergized winding. This is submitted to polarity inversion circuit 68 which inverts the polarity of the slope of the back EMF segment under consideration. For example, in FIG. 1A the back EMF segment 36 has a negative-going slope, whereas the following back EMF segment 38 has a positive slope. Polarity inversion circuit 68 inverts the polarity of negative sloped back EMF segment 36 so that it will have the same positive slope as back EMF segment 38.

The back EMF segments, now all having positive slopes, are fed to normalizing circuit 70 which normalizes the magnitude as well as the phase of the back EMF segment. Normalizing circuit 70 receives each of the unenergized winding back EMF segments 36 and 38 and scales their amplitude and frequency to closely match that of the sine reference 74. By making constant the frequency of the segments 36 and 38 to match the sine reference 74, each sample section of the back EMF of the unenergized winding is assured of containing the same number of data points independent of the speed of the rotor for cross correlation circuit 72.

The normalized back EMF segments are delivered to cross-correlation circuit 72 where they are each compared with sinusoidal reference 74. The output of cross-correlation circuit 72 represents the estimated rotor position $\rho_{est}$. This is compared with the rotor reference angle $\rho^*$ in summing circuit 76 to produce the rotor angle error $\Delta\rho$.

Figure 3:
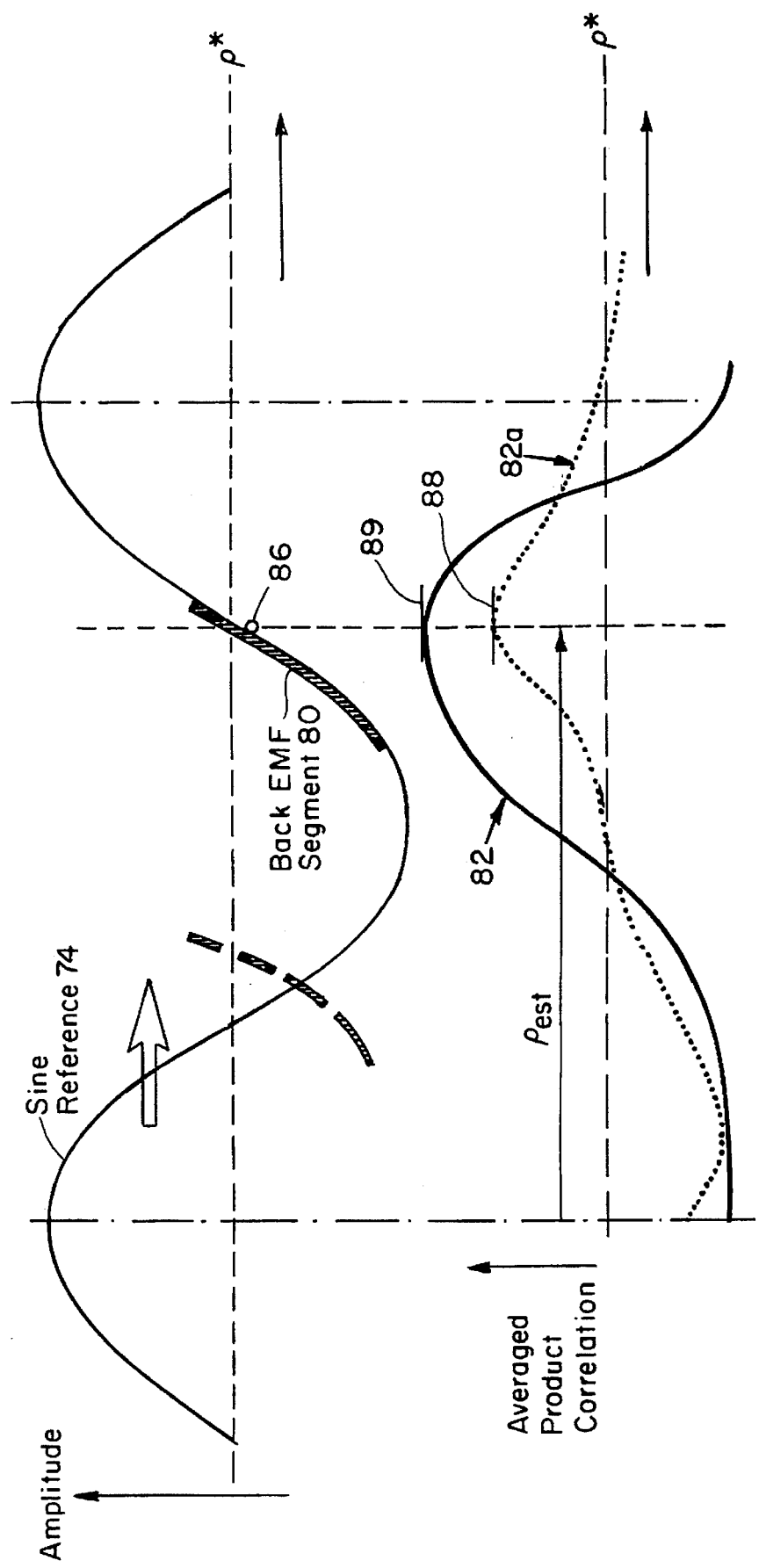
FIG. 3 illustrates the matching of the back EMF segment with the sine reference and the resulting average product of the cross-correlation.

Cross-correlation is effected by matching a sample section 80 of the back EMF with the sine reference 74, FIG. 3. Because the section 80 contains a number of points instead of just one, the matching is more precise and more reliable than mere thresholding approaches, for example. For example, even with differences in scale of phase and amplitude, the average product of the correlation 82 will still identify the optimum match point 86. Thus even if the scale changes so that the average product correlation takes on a different configuration such as at 82a, the optimum match point 86 would still be identified, as can be seen by the fact that both curves 82 and 82a have their maximum along line 88. Each cycle of sine reference 74 and of back EMF signals $E_A$, $E_B$ and $E_C$ have sixty-four data points. Each sample section 86 has eight data points. Cross correlation is effected by multiplying each of the sixty-four data point sets 1-8, 2-9, 3-10, 4 . . . 58-1, by the eight data points of section 86 to obtain the raw correlation product. The raw correlation product for each set is normalized by dividing it by the product of multiplication of each data point set by itself. The result is the product 82 whose maximum at 89 indicates the best-match position of section 80 with sine reference 74. The output $\rho_{est}$ represents the position of the rotor with respect to the position of the field. This value of $\rho_{est}$ is compared with the optimum position $\rho^*$ of the rotor with respect to that field position θ. Any difference reflects an error $\Delta\rho$ which will be responded to by error integrator 22, FIG. 1, to modify the speed of the rotor to minimize $\Delta\rho$.

Center point estimator 66, FIG. 2, is shown in greater detail in FIG. 4, where the three windings 14, 16, 18, also designated as A, B and C windings, respectively, are interconnected with pulse width modulator and converter 40, FIG. 1. Assume winding 16 is unenergized. Voltages from terminal 100, FIG. 2, to ground terminal 102, $V_{TA}$, and from terminal 104 to ground terminal 102, $V_{TC}$, are determined and averaged to obtain the voltage $V_{TN}$ at common terminal 106. The voltage $V_{TB}$ between terminal 108 and ground terminal 102 is then measured. That voltage $V_{TB}$ is algebraically combined in summing circuit 64 with the voltage $V_{TN}$ at common terminal 106. The difference then delivered to polarity inversion circuit 68 is the back EMF $E_B$ across winding B 16.

Figure 1A:
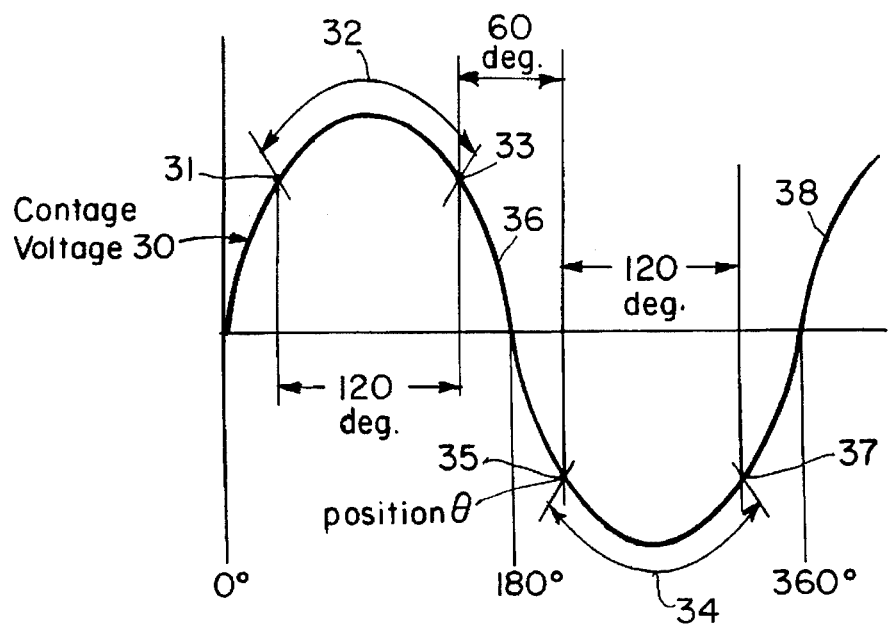
FIG. 1A illustrates a sinusoidal waveform used to drive a winding in the permanent magnet synchronous motor.
Figure 1B:
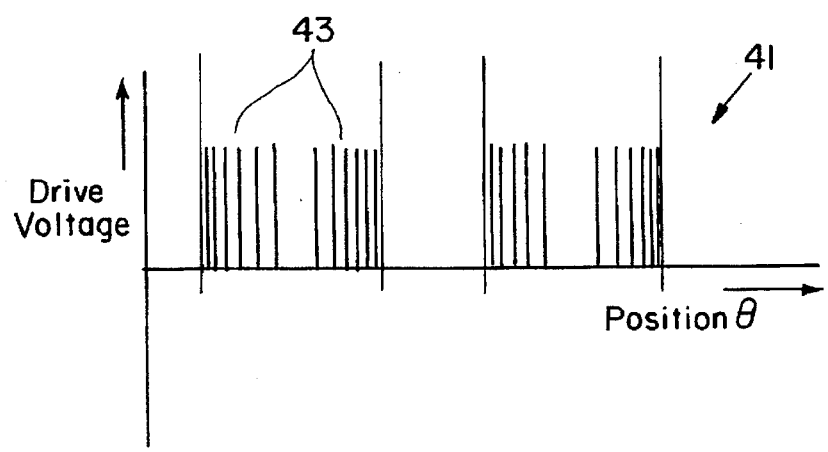
FIG. 1B illustrates the pulse width modulated switching waveforms applied to the converter power devices as defined by the sinusoidal waveform in FIG. 1A.

The function of control system 10 with the exception of the power output circuitry in PWM and converter 40 may be implemented in software using an ADSP 2101 microprocessor programmed in accordance with FIGS. 5A and 5B. There is shown in FIG. 5A the motor control loop routine which begins, step 100, with the initialization of the software. In step 102 inquiry is made as to whether this is a new pulse width modulation cycle. If it is not, the system cycles back to step 102. If it is, the terminal voltages $V_{TA}$, $V_{TB}$ and $V_{TC}$ are measured in step 104. The back EMF value is calculated and stored in the buffer in step 106 and the rotor speed ω, the gain factor M, and rotor position θ are calculated from the rotor position error $\Delta\rho$ in step 108. Next, in step 110 the segments are selected representative of the condition of the coils, that is, whether they are energized or de-energized, for example as depicted in FIG. 1A, and the duty cycles of the pulse width modulations are determined. In step 112 the pulse width modulation duty cycles are written to the hardware and the loop returns again to step 102. After the back EMF values have been calculated sixty-four times representing the sixty-four data points in step 106, the position estimator loop, FIG. 5B, is called upon. The inquiry is then made as to whether the back EMF buffer is full in step 114. If it is not, the system returns to step 114. If it is, the back EMF data is read in step 116 and the frequency or time pulses and phase are normalized in step 118. Then the cross-correlation product is calculated using the sine reference in step 120 and raw $\rho_{est}$ estimate is determined to provide the new $\Delta\rho$ rotor error in step 122.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A control system for a permanent magnet synchronous motor, comprising:

position estimator means, including means for cross-correlating the back EMF of an unenergized winding with a reference waveform to determine an estimated position of the rotor, for determining rotor angle position error;

error compensation means, responsive to the rotor angle position error, for determining the angular speed of the field;

angle generator means, responsive to the angular speed of the field, for generating a field angle position; and a waveform generator, responsive to the field angle position, for generating a periodic signal corresponding to each winding and designating a segment of that signal for driving that winding to adjust the angular speed of the field to equal rotor speed.

2. The control system of claim 1 in which said position estimator means includes means for determining the back EMF voltage across the unenergized winding.

3. The control system of claim 1 in which said position estimator means includes means, responsive to said means for determining, for normalizing the back EMF voltage across the unenergized winding.

4. The control system of claim 3 in which said position estimator means includes means for normalizing the phase of the back EMF voltage across the unenergized winding.

5. The control system of claim 3 in which said position estimator means includes means for normalizing the magnitude of the back EMF voltage across the unenergized winding.

6. The control system of claim 1 in which said position estimator means includes means for determining the difference between the estimated rotor angle and a predetermined rotor reference angle to establish the rotor angle error.

7. The control system of claim 3 in which said position estimator means includes polarity inversion means for converting the back EMF voltage across the unenergized windings to all have the same polarity slope.

8. The control system of claim 2 in which there are three field windings in the motor and said means for determining the back EMF across the unenergized winding includes means for determining the voltage between the unenergized winding and a reference, a center point estimator means for determining the voltage from the common point of the two energize windings to said reference, and means for combining those two voltages to obtain the voltage across the unenergized winding.

9. The control system of claim 1 further including a velocity feedback loop including summing means for combining the angular speed of the rotor with a preset speed to determine the speed error, and means, responsive to the speed error, to adjust said waveform generator to change the voltage amplitude of the periodic signal.

* * * * *